March 9, 1965 A. C. SANFORD 3,172,125
TRUSS FABRICATING APPARATUS
Filed Oct. 3, 1962 8 Sheets-Sheet 1

INVENTOR.
ARTHUR CAROL SANFORD
BY Hamilton & Cook
ATTORNEYS

March 9, 1965

A. C. SANFORD 3,172,125

TRUSS FABRICATING APPARATUS

Filed Oct. 3, 1962

INVENTOR.
ARTHUR CAROL SANFORD
BY *Hamilton & Cook*
ATTORNEYS

March 9, 1965  A. C. SANFORD  3,172,125
TRUSS FABRICATING APPARATUS
Filed Oct. 3, 1962  8 Sheets-Sheet 5

INVENTOR.
ARTHUR CAROL SANFORD
BY Hamilton & Cook
ATTORNEYS

March 9, 1965 A. C. SANFORD 3,172,125
TRUSS FABRICATING APPARATUS
Filed Oct. 3, 1962 8 Sheets-Sheet 6

INVENTOR.
ARTHUR CAROL SANFORD
BY
ATTORNEYS

March 9, 1965   A. C. SANFORD   3,172,125
TRUSS FABRICATING APPARATUS
Filed Oct. 3, 1962   8 Sheets-Sheet 8

INVENTOR.
ARTHUR CAROL SANFORD
BY *Hamilton & Cook*

ATTORNEYS

United States Patent Office 3,172,125
Patented Mar. 9, 1965

3,172,125
TRUSS FABRICATING APPARATUS
Arthur Carol Sanford, Fort Lauderdale, Fla., assignor to Sanford Industries, Inc., Pompano Beach, Fla., a corporation of Florida
Filed Oct. 3, 1962, Ser. No. 228,034
7 Claims. (Cl. 1—149)

The present invention relates generally to the fabrication of wooden trusses. More particularly, the present invention relates to an apparatus for joining the structural members of wooden trusses. Specifically, the present invention relates to an apparatus for fabricating wooden trusses by the use of metallic connector plates.

The development of improved connector plates has provided the means for prefabricating lightweight and inexpensive trusses from dimensional lumber.

The connector plates themselves are metallic sheets, of approximately 16–20 gauge, from which are punched a multiplicity of closely spaced pointed projections. These projections preferably extend outwardly from only one face of the plate but may extend outwardly from both faces. When the projections, or teeth, extend outwardly from only one face the plate is an "exterior" plate and is especially suited for connecting butted joints. When the teeth extend outwardly from both faces the plate is a "sandwich" plate and is especially suited for connecting lapped joints. The concept of the present invention is as equally applicable for fabricating trusses with lapped as well as butt joints, but will only be described in conjunction with the fabrication of butt joint trusses as that will impart a complete understanding of the concept of the present invention.

Exterior connector plates are applied to the sides of joints between the various truss members and the teeth forced into the wood. The load stress at the joints is thusly distributed over a relatively large area, i.e., the area of the connector plate. Moreover, the teeth are spaced sufficiently apart and so shaped as to be inserted as much inter-fibrously as possible with very little fiber destruction. This increased strength at the joint permits increasing the allowable span of the truss and lowering the allowable pitch. Considerably more pressure is required to apply the connector plate to the truss than can be readily exerted by a man with a hammer. Consequently, heretofore the assemblymen would lay out the truss on the work table and place a connector plate over each joint. These plates were then tacked in position by driving a plurality of nails through nail holes provided in the plate. These nails were required not only to hold the plate in position until it was fully set but were also required to retain the truss members in abutting position until the last step of the fabrication. When all the connector plates were thus applied to one side of the truss, the truss was turned over and the process repeated. The partially constructed truss was then passed through a roller press or the joints were successively placed beneath a hammer press to drive the teeth fully into the wood. This method, however, is arduous, inefficiently time consuming and expensive.

It is therefore an object of the present invention to provide an apparatus for the fabrication of wooden trusses with connector plates quickly and inexpensively.

It is another object of the present invention to provide an apparatus for the fabrication of wooden trusses with connector plates without initially tacking the plates in place with nails.

It is a further object of the present invention to provide an apparatus for the fabrication of wooden trusses with exterior connector plates in which the plates can be applied to both sides of the truss without turning the truss.

It is a still further object of the present invention to provide an apparatus for the fabrication of wooden trusses having varied span and pitch with connector plates.

These and other objects which will become apparent from the following specification are accomplished by means hereinafter described and claimed.

One preferred embodiment of the present invention is shown by way of example in the accompanying drawings and described in detail without attempting to show all of the various modifications in which the invention might be embodied; the invention being measured by the appended claims and not by the details of the specification.

Figure 1:
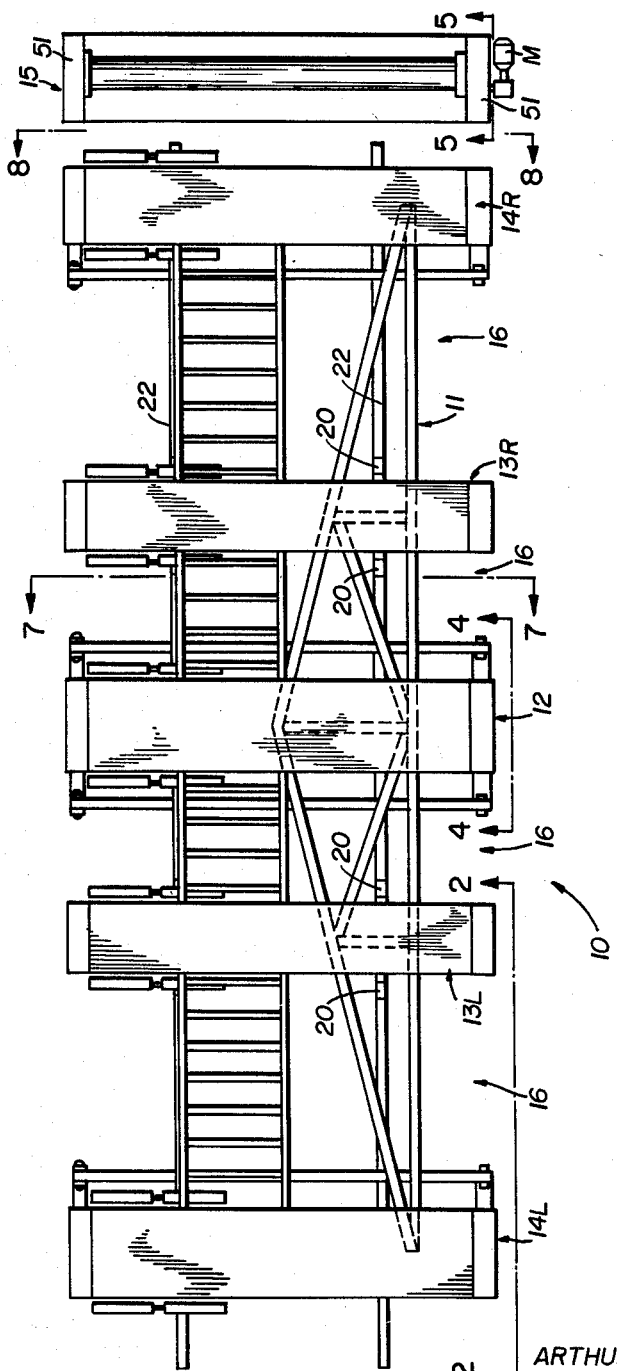
FIG. 1 is a top plan view of a truss fabricating machine according to the present invention.
Figure 2:
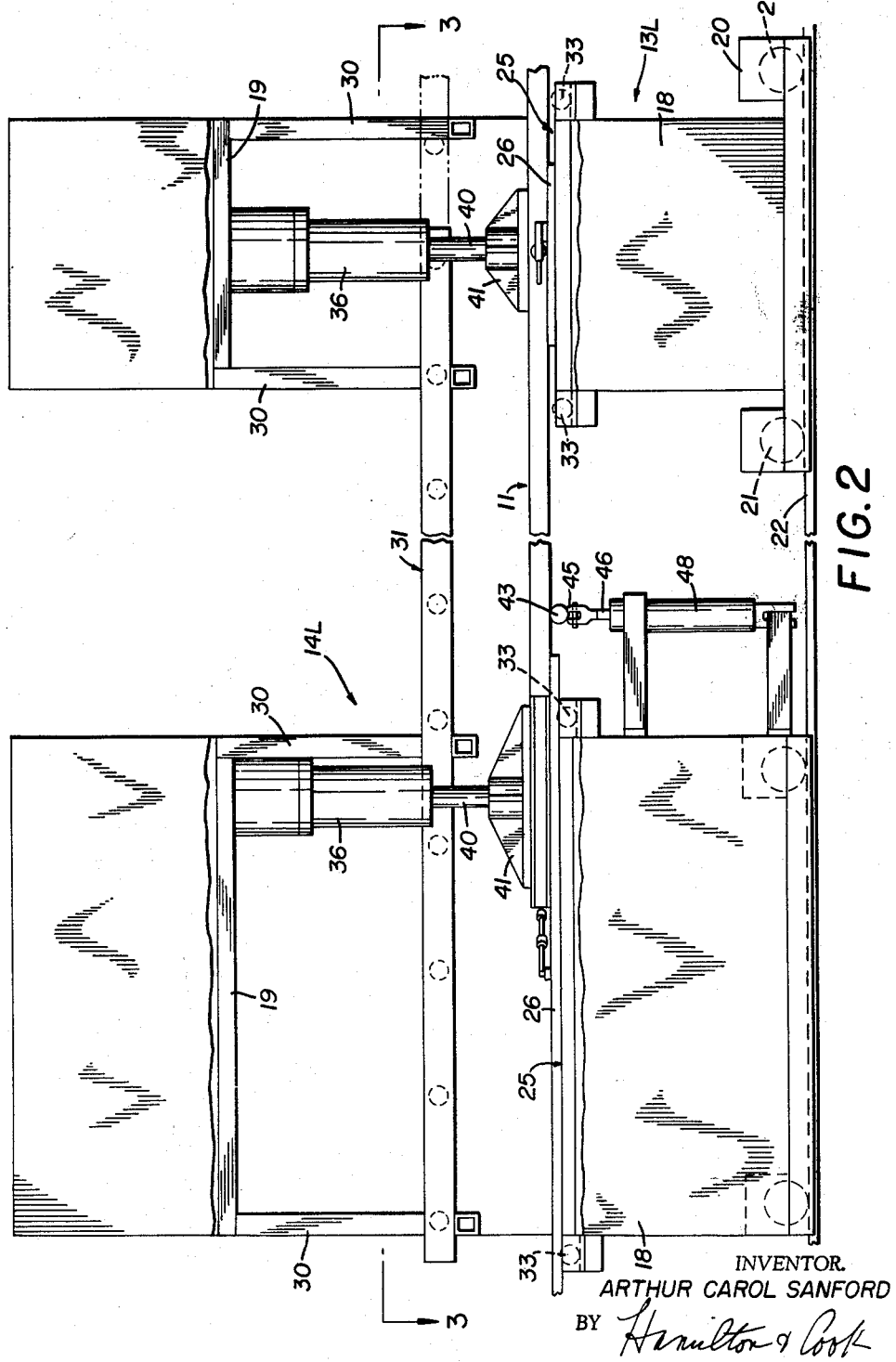
FIG. 2 is an enlarged frontal elevation partly broken away taken substantially on line 2—2 of FIG. 1.
Figure 3:
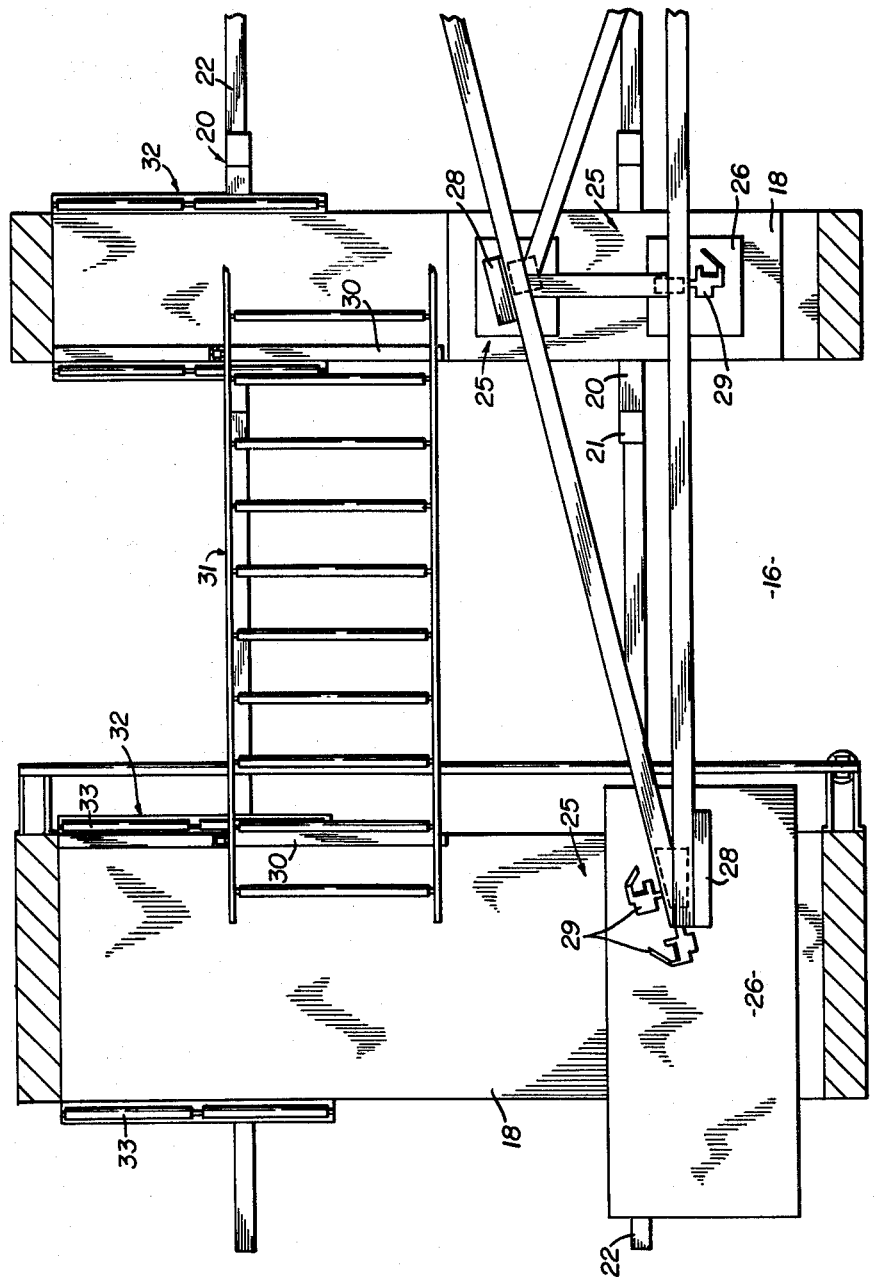
Figure 4:
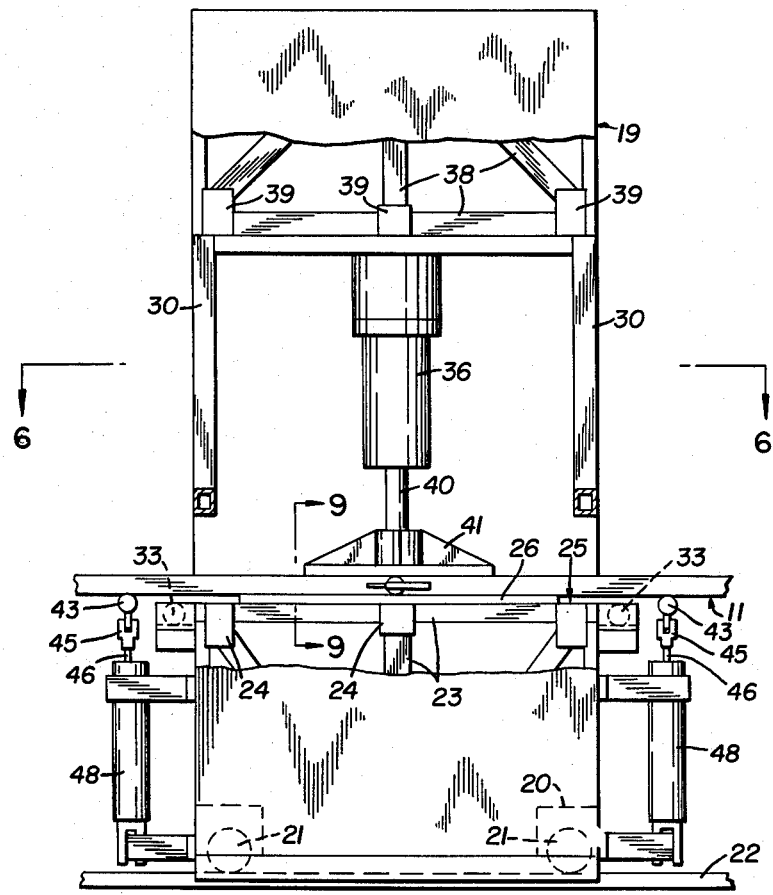
Figure 5:
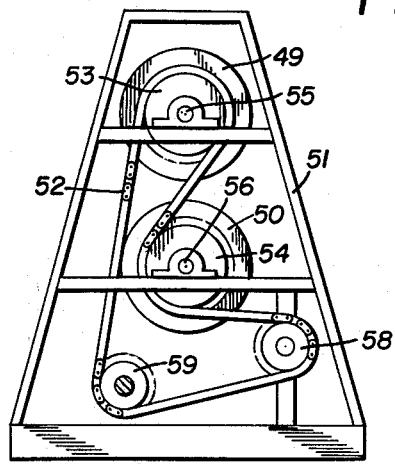
Figure 6:
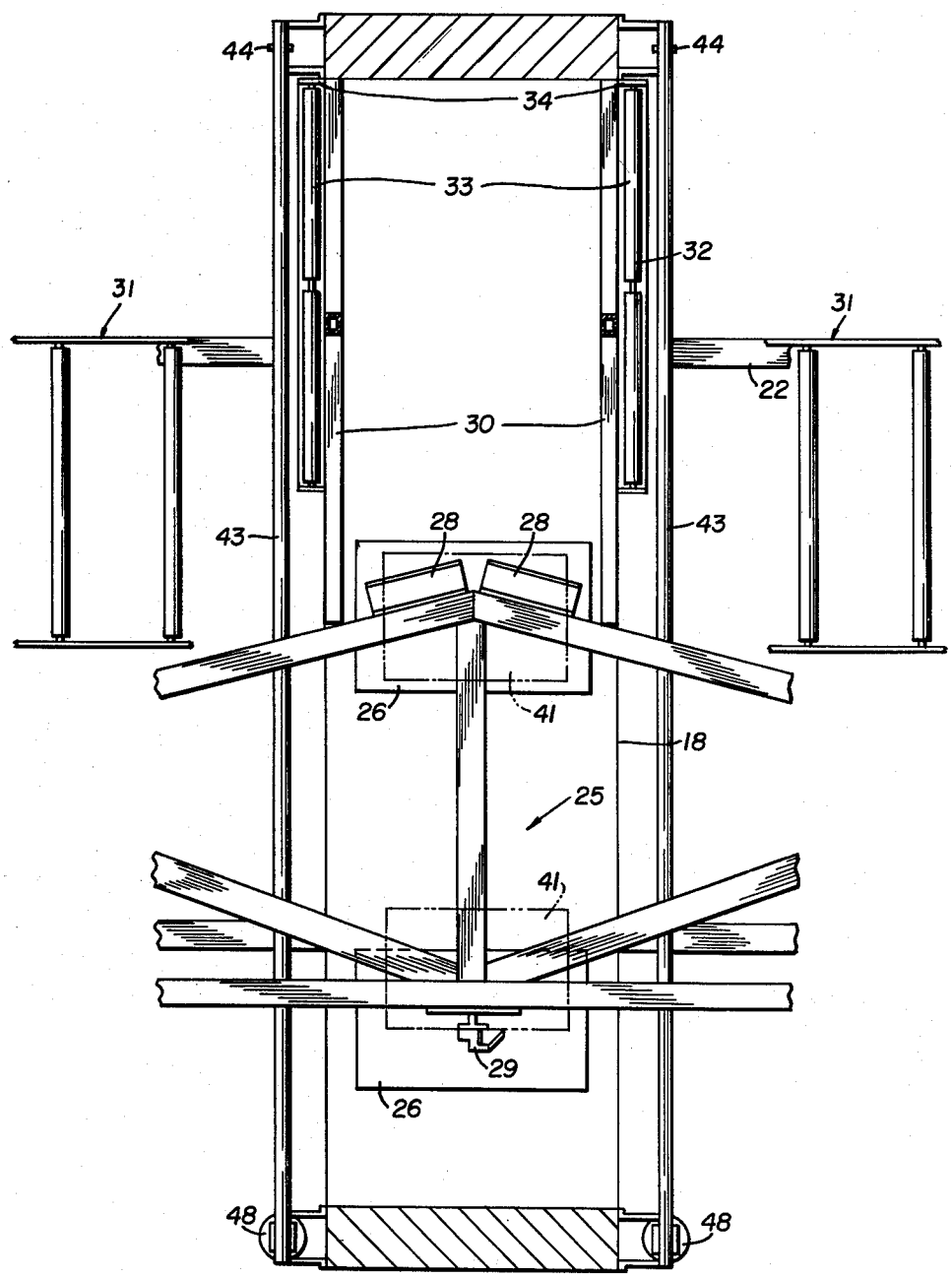
Figure 7:
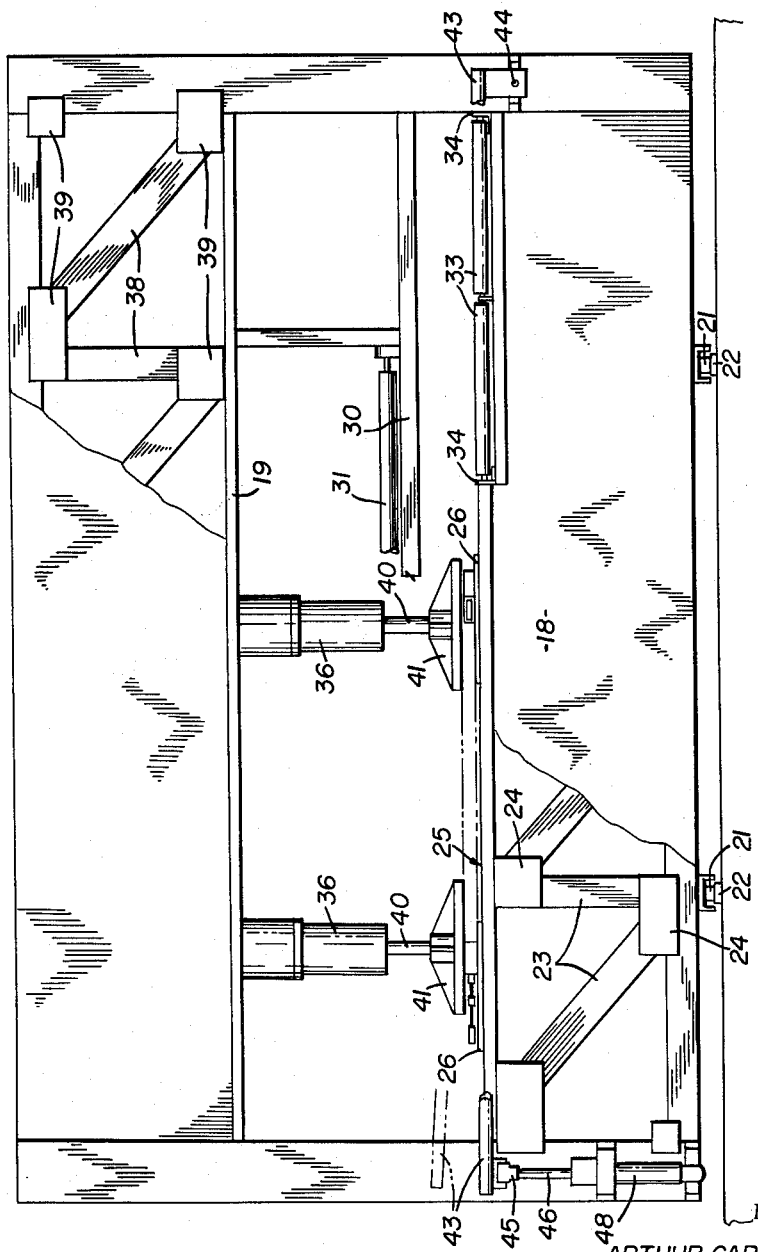
Figure 8:
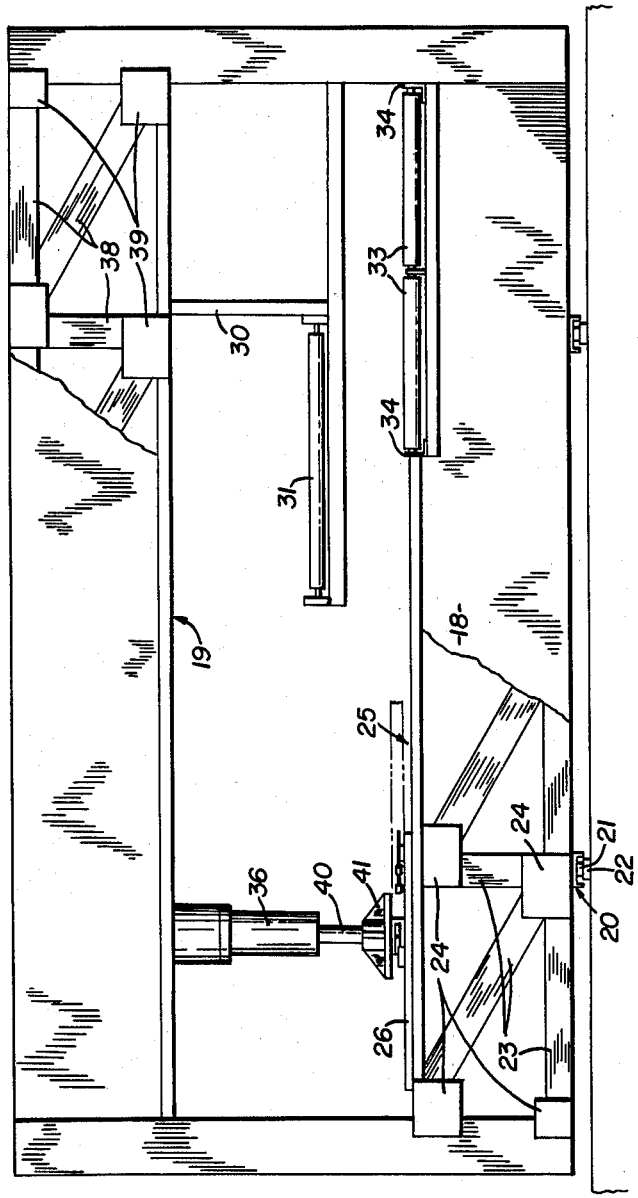
Figure 9:
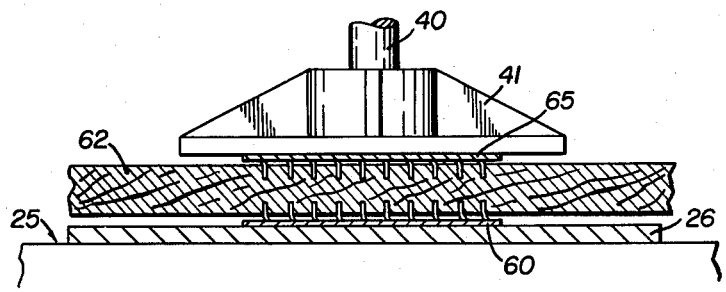
Figure 10:
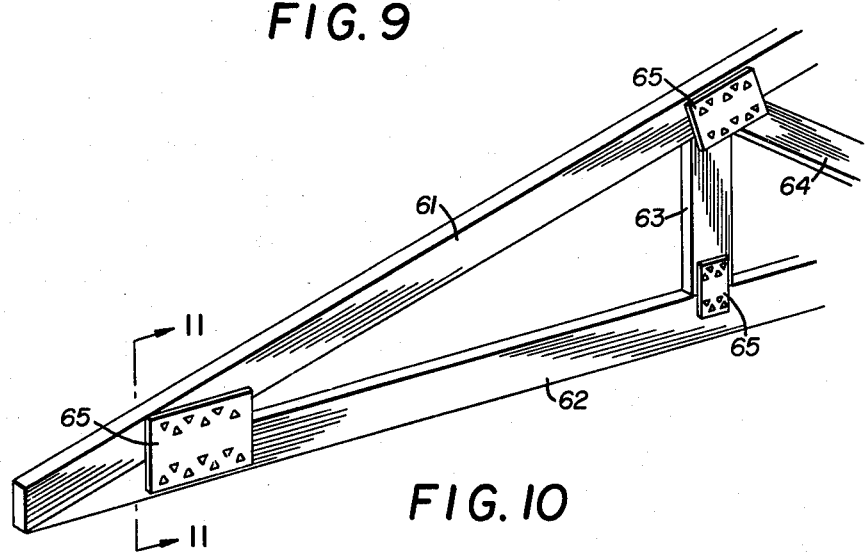
Figure 11:
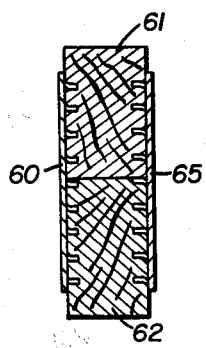

FIG. 3 is a cross section taken substantially on line 3—3 of FIG. 2 with the fluid cylinders 36 and pressure plates 41 removed;

FIG. 4 is an enlarged frontal elevation partly broken away taken substantially on line 4—4 of FIG. 1;

FIG. 5 is a vertical cross section taken substantially on line 5—5 of FIG. 1;

FIG. 6 is a horizontal cross section taken substantially on line 6—6 of FIG 4 with the fluid cylinder 36 and pressure plate 41 removed;

FIG. 7 is an enlarged vertical cross section taken substantially on line 7—7 of FIG. 1 showing one of the stamping stations of the truss fabricating machine according to the present invention in side elevation partly broken away;

FIG. 8 is a view similar to FIG. 7 taken substantially on line 8—8 of FIG. 1;

FIG. 9 is a further enlarged cross section taken substantially on line 9—9 of FIG. 4;

FIG. 10 is a perspective of a truss fabricated according to the concept of the present invention showing the heel joint and two intermediate cord joints; and, FIG. 11 is a cross section taken substantially on line 11—11 of FIG. 10.

In general, a truss fabricating machine according to the present invention comprises a plurality of aligned longitudinally spaced laterally extending stamping stations. Each station is provided with a supporting bench upon which, compositely, the truss is assembled. In assembling the truss each joint must rest on a supporting bench and the stamping stations are therefore preferably movable toward and away from one another in order to accommodate the assembly of trusses of various sizes and configurations.

Moreover, the use of a plurality of stamping stations provides a work bay adjacent each station which permits the assemblymen to lay out the components of the truss on and across the forward or assembly portion of the supporting benches on the stamping stations. In doing so the assemblyman also properly positions the connector plates on both sides of or between the structural members at the joints. Jig and clamping means are provided to assure uniformity of assembly.

When thus preliminarily assembled, a stamping press means carried on the bridged spanning portion of each station above the supporting bench is actuated. The stamping press means operates downwardly against the supporting bench and drives the teeth of the connector plates into the wooden truss members of the truss at least far enough to tie the truss together. Upon withdrawal of the stamping press means an ejector means extracts the truss from the jig and moves it onto a removing conveyor means rearwardly of the assembly portion of the supporting bench. The truss is carried along the conveyor means to a roller press. Passage of the truss through the roller press fully sets the teeth of the connector plate into the truss.

A conveyor is dependingly supported between the bridged spanning portions of the adjacent stamping stations along which the truss components can be supplied to the assemblyman.

One complete fabricating machine combines a plurality of stamping stations, adapted for the assembly of a single truss, with a rolling press means. However, additional stamping stations can be aligned with the basic machine in sufficient number concurrently to assemble one or more additional trusses and transport them along the removing conveyor means on the basic machine to the rolling press thereon.

Referring now to the drawings, a truss fabricating machine according to the present invention and capable of performing the methods thereof, indicated generally by the numeral 10, is shown in its entirety in FIG. 1 with a truss 11 depicted in assembly position. The size and configuration of truss 11 requires the use of a main stamping station 12, two intermediary stamping stations 13R and 13L and two end stamping stations 14R and 14L which are aligned and parallel with a rolling press means 15 and spaced apart from each other to provide work bays 16 therebetween and support the truss at all joints.

Each stamping station, whether main 12, intermediate 13R and 13L, or end 14R and 14L, has a supporting bench 18 and a bridged spanning portion 19 spaced above the bench 18. Each stamping station is preferably carried on a truck assembly 20 and provided with wheels 21 for rolling engagement with the track way 22 to permit the stations to be movable toward and away from each other.

Supporting bench 18 is constructed from a latticework of truss members 23 which, as shown in FIGS. 4 and 7, may also be joined by connector plates 24. Across the forward, or assembly portion, 25 of the top surface of the supporting bench 18 is a hard, preferably metallic press plate 26 upon which may be mounted the jig stops 28 and quick release clamps 29 (FIGS. 3 and 6) to hold the components in position in the area of each truss joint until the teeth of the connector plates have been imbedded sufficiently to retain the components of the truss in assembled position.

Inverted T-shaped support brackets 30 depend from the bridged spanning portion 19 above the supporting bench 18 and slightly rearwardly of the assembly portion 25 so as to support a roller conveyor 31, within ready accessibility of an assemblyman working in any of the work bays 16.

Below the supply conveyor 31 and rearwardly of the assembly portion 25 is a truss removing conveyor 32 preferably comprising a series of cylindrical rollers 33 journaled for free rotation in bearing blocks 34 on the supporting bench 18. Truss removing conveyor 32 receives the truss after it has been ejected from the assembly portion 25 of the bench 18, as will be more fully hereinafter described, and transports it to the roller press 15.

Dependingly mounted from each bridged spanning portion 19 above and operatively associated with each pressure plate 26, is a stamping press means, or pressure operated fluid cylinder, 36. The base of the cylinder 36 is attached, by suitable means not shown, to the frame work of the bridged spanning portion 19, which also may comprise a latticework of truss members 38 joined by connector plates 39, as shown in FIG. 7.

A double acting piston rod 40 is reciprocatingly powered by said cylinder 36 and carries a hammer, or pressure plate, 41 on the lower end thereof. The hammers 41 on at least the intermediate stations are preferably selectively rotatable on rod 40 to facilitate assembly of, for example, a fink type truss.

On both sides of the main stamping station 12 and on the side of the end stamping station 14 toward the main stamping station are powered ejecting means, indicated generally by the numeral 42. If desired, more may be provided but this arrangement is generally quite satisfactory. Each ejecting means comprises a slide, or removing bar 43 pivotally mounted at the rear of and slightly beneath the level of the truss removing conveyor 32, as at 44. The slide bar 43 extends forwardly from pivot point 44 along the side of the supporting bench 18, including the assembly portion 25 and press plates 26, to connect, as by clevis 45, to the piston rod 46 of the fluid pressure means, or cylinder, 48.

The roller press 15, aligned with the truss removing conveyor 32, comprises at least two spaced apart parallel rollers 49 and 50 journaled in end frames 51 (FIG. 5) powered for rotation by chain 52 reaved around sprockets 53 and 54 on the shafts 55 and 56 on rollers 49 and 50 respectively, idler sprocket 58, and drive sprocket 59 turned by motor M (FIG. 1).

To fabricate a truss with exterior connector plates by a machine constructed in accordance with the concept of the present invention, the truss connector plates 60 are placed teeth up in the appropriate predetermined location on each press plate 26. Then the upper and lower chord members, 61 and 62, together with the vertical and diagonal bracing members, 63 and 64, respectively, are taken from supply conveyor 31 and arranged within the jig formed by jig stops 28 and quick release clamps 29. If each connector plate 60 has been properly placed all the truss joints will be spanned by an appropriate connector plate on the underside of the assembly of the truss members and similar connector plate 65 can be placed teeth down on the upper side of the assembly. Thereafter, the operator actuates the fluid pressure cylinders 36 and the hammers 41 drive toward press plates 26. Each hammer 41 contacts a connector plate 65 and each press plate 26 contacts a connector plate 60, driving the teeth 66 on each plate into the wooden truss members, as shown in FIG. 9.

After the teeth have been thus set and the hammers raised, the truss 11 is removed from the assembly portion 25 of the bench 18 by releasing the quick acting clamps 29 and actuating cylinders 48. It will be noted that the quick acting clamps 29 are cooperatively placed in opposition to the jig stops 28 to facilitate releasing the truss from the assembling jig.

Upon actuation of the cylinders 48, the rods 46 are extended, raising the forward end of the bars 43 to tilt them about their pivot point 44 as indicated in dotted lines in FIG. 7. This lifts the truss 11 upwardly off the assembly portion 25 of the bench 18 and above the jig stops and quick release clamps. The truss 11 is then slid along the inclined guide bar 43 onto the removing conveyor 32 which transports it to the roller press 15. As the truss 11 passes between the rollers 49 and 50 of press 15, the teeth 66 of connector plates 60 and 65 are fully and completely imbedded into the truss members, as shown in FIG. 11, thus completing the fabrication of the truss the members of which are joined by connector plates, as shown in FIG. 10.

It should thus be apparent that according to the concept of the present invention a truss can be fabricated quickly and inexpensively by the use of toothed connector plates applied simultaneously on both sides of the truss at the joints without preliminary tacking.

The truss members are held in place by jigs while all the plates are partially embedded into the wood by simultaneously actuated press plates, and then the joined truss is released and slid onto the removing conveyor and transported to the roller press which completes the full embedding of the teeth into the truss joints.

What is claimed is:

1. In a truss fabricating machine, a stamping station, said stamping station comprising a suporting bench and a bridged spanning portion spaced above said supporting bench, said supporting bench having an assembling portion and a truss removing conveyor rearwardly of said assembling portion, at least one press plate on said assembling portion, jig means at said press plate, hammer means depending from said spanning portion in opposition to each said press plate and movable toward said press plate under pressure, and ejecting means for tilting a truss supported on said assembling portion to transfer it onto said truss removing conveyor.

2. In a truss fabricating machine, a stamping station, said stamping station comprising a supporting bench and a bridged spanning portion spaced above said supporting bench, said supporting bench having an assembling portion and a truss removing conveyor rearwardly of said assembling portion, at least one press plate on said assembling portion, jig means at said press plate, hammer means depending from said spanning portion in opposition to each said press plate and movable toward said press plate under pressure, a slide bar at the side of said supporting bench, said slide bar pivoted at the rear of said removing conveyor and extending forwardly along the assembling portion of said supporting bench, power means to pivot said bar and raise the forward end above said assembly portion to tilt a truss supported thereon for sliding it onto said truss removing conveyor.

3. In a truss fabricating machine, a stamping station, said stamping station comprisng a supporting bench and a bridged spanning portion spaced above said supporting bench, said supporting bench having an assembling portion and a truss removing conveyor rearwardly of said assembling portion, at least one press plate on said assembling portion, jig means at said press plate, fluid pressure operated hammer means depending from said spanning portion in opposition to each said press plate and movable toward said press plate under pressure.

4. In a truss fabricating machine, a stamping station, said stamping station comprising a supporting bench and a bridged spanning portion spaced above said supporting bench, said supporting bench having an assembly portion and a truss removing conveyor rearwardly of said assembly portion, at least one press plate on said assembly portion, jig means at said press plate, fluid pressure operated hammer means depending from said spanning portion in opposition to each said press plate and movable toward said press plate under pressure, a slide bar at the side of said supporting bench, said slide bar pivoted at the rear of said truss removing conveyor and extending forwardly along the assembly portion of said supporting bench, power means to pivot said slide bar and raise the forward end above said assembly portion to lift a truss supported thereon for sliding it onto said truss removing conveyor.

5. In a truss fabricating machine, a stamping station as defined in claim 4 mounted for lateral movement on a truck assembly.

6. A truss fabricating machine comprising, a plurality of aligned, laterally extending stamping stations, movable toward and away from each other, each said stamping station having a suporting bench and a bridged spanning portion spaced above said bench, said supporting bench having an assembling portion and a longitudinal truss removing conveyor rearwardly of said assembly portion, at least one press plate on each assembling portion with jig means at said press plate, a hammer means dependingly supported from said bridged spanning portion in opposition to said press plates, means to move said hammer means toward said pressure plate under pressure, ejecting means on at least one said stamping station for raising a truss supported on said press plate and transferring it onto said truss removing conveyor.

7. A truss fabricating machine comprising, a plurality of aligned, laterally extending stamping stations, movable toward and away from each other, each said stamping station having a supporting bench and a bridged spanning portion spaced above said bench, said supporting bench having an assembling portion and a longitudinal truss removing conveyor rearwardly of said assembly portion, at least one press plate on each assembling portion with jig means at said press plate, a hammer means dependingly supported from said bridged spanning portion in opposition to said press plates, means to move said hammer means toward said pressure plate under pressure, a support bracket depending from said bridged spanning portion rearwardly of said hammer means, said support bracket carrying a longitudinal supply conveyor means above and rearwardly of said assembly portion, a lateral slide bar at the side of at least one said stamping station, said slide bar pivoted at the rear of said truss removing conveyor and extending forwardly along the assembling portion of said supporting bench, power means to pivot said bar and raise the forward end above said assembly portion to raise the truss supported thereon and transfer it onto said truss removing conveyor.

References Cited in the file of this patent
UNITED STATES PATENTS

| | | |
|---|---|---|
| 2,001,712 | Dinzl | May 21, 1935 |
| 3,079,607 | Jureit | Mar. 5, 1963 |
| 3,100,301 | Black | Aug. 13, 1963 |